United States Patent [19]

Bennett et al.

[11] Patent Number: 5,392,878

[45] Date of Patent: Feb. 28, 1995

[54] BULK MATERIAL LOAD VEHICLE ACCESS SYSTEM

[75] Inventors: Ronald W. Bennett; Bruce A. Pech, both of Florence, S.C.

[73] Assignee: Aluminum Ladder Company, Florence, S.C.

[21] Appl. No.: 163,584

[22] Filed: Dec. 6, 1993

Related U.S. Application Data

[63] Continuation of Ser. No. 32,413, Mar. 15, 1993, abandoned, which is a continuation of Ser. No. 750,624, Aug. 27, 1991, abandoned, which is a continuation of Ser. No. 538,765, Jun. 15, 1990, Pat. No. 5,042,612.

[51] Int. Cl.⁶ ............................ E04G 1/00; E04G 3/00
[52] U.S. Cl. .................................... 182/115; 182/1; 182/131; 182/145
[58] Field of Search .................... 182/1, 63, 127, 145, 182/146, 137, 131, 115

[56] References Cited

U.S. PATENT DOCUMENTS

| | | | |
|---|---|---|---|
| 1,808,492 | 6/1931 | Bocchino | 182/85 |
| 2,569,653 | 10/1951 | Boedecker | 182/145 |
| 3,451,504 | 6/1969 | Logan | 182/1 |
| 3,576,233 | 4/1971 | Thatcher | 182/145 X |
| 3,638,757 | 2/1972 | Sampson | 182/145 X |
| 4,013,140 | 3/1977 | Pradon | 182/1 |
| 4,125,173 | 11/1978 | Rust et al. | 182/145 X |
| 4,498,556 | 2/1985 | Garton | 182/148 X |
| 4,572,328 | 2/1986 | Benko | 182/1 |
| 4,679,657 | 7/1987 | Bennett | 182/1 |
| 5,042,612 | 8/1991 | Bennett | 182/1 |

Primary Examiner—Karen J. Chotkowski
Attorney, Agent, or Firm—Hardaway Law Firm

[57] ABSTRACT

An upstanding support structure is provided defining an elevated horizontally elongated stationery platform extending along one side of the support structure and a horizontally elongated second platform is mounted, in cantilever fashion, from the one side of the support structure for vertical shifting relative thereto so as to be downwardly displacable over the upper portion of an elongated bulk material receiving vehicle disposed along side the one side of the support structure adjacent the lower end thereof. The second platform includes a first side fence extending along the side thereof adjacent the support structure as well as end fences extending across the ends of the second platform and appreciably outwardly beyond the outer side of the second platform. An outer fence extends between and interconnects the outer ends of the end fences and the second platform and the outer side fence are positionable over remote opposite side upper portions of a bulk material receiving vehicle disposed beneath the second platform.

12 Claims, 4 Drawing Sheets

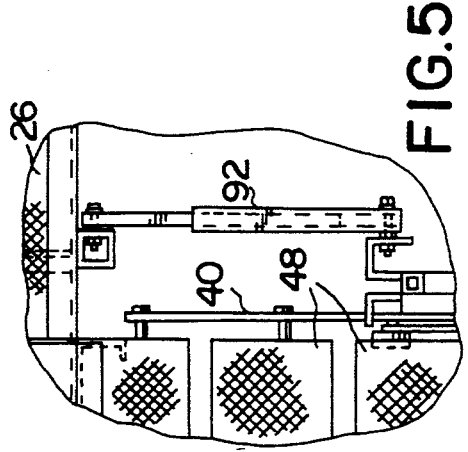
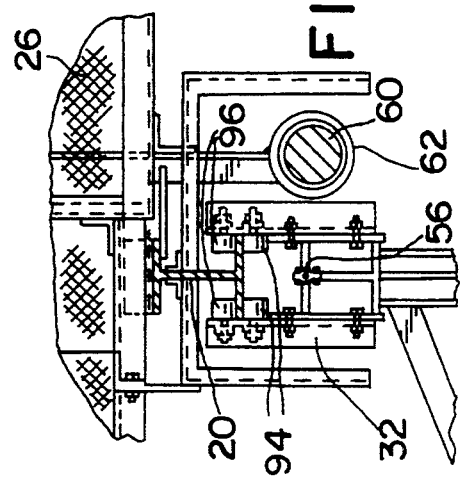
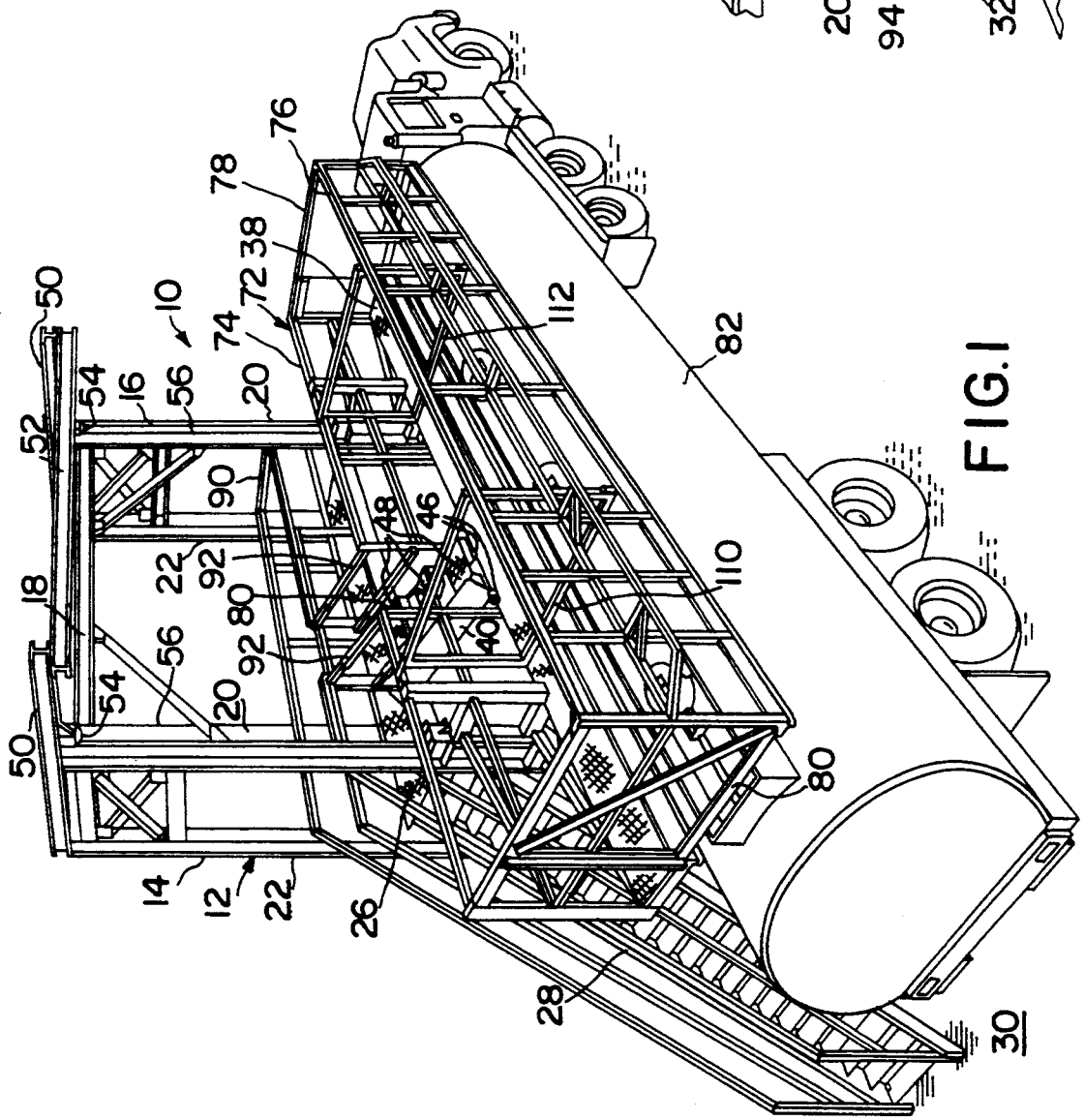

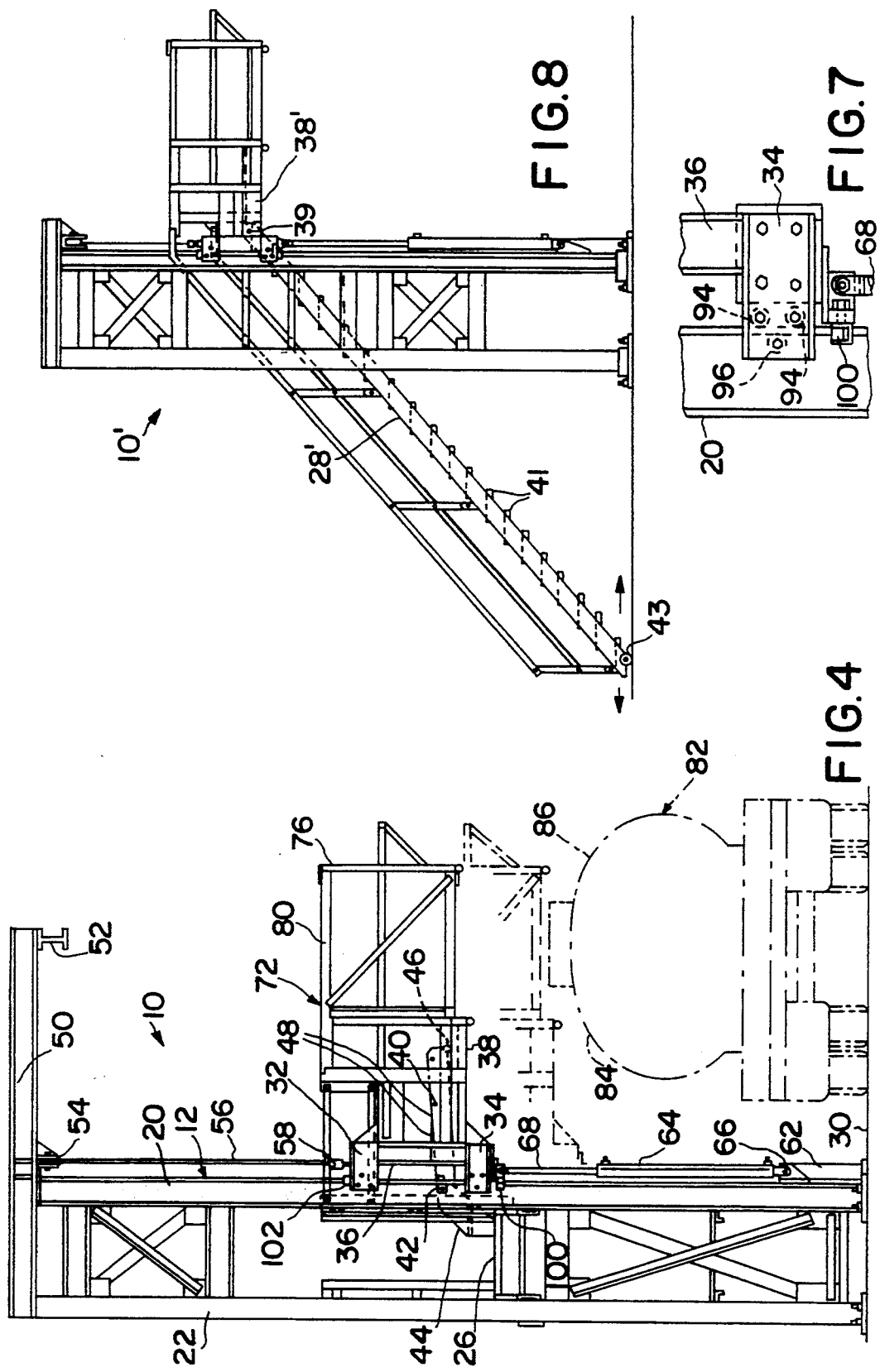

BULK MATERIAL LOAD VEHICLE ACCESS SYSTEM

This is a continuation of Ser. No. 08/032,413,filed Mar. 15, 1993, now abandoned, which is a continuation of application Ser. No. 07/750,624, filed Aug. 27, 1991, now abandoned, which is a continuation of application Ser. No. 07/538,765, filed Jun. 15, 1990, now U.S. Pat. No. 5,042,612.

BACKGROUND OF THE INVENTION

1. Field of the Invention

This invention relates to an elevated work person supporting structure including a first side margin relative to which a horizontally elongated work person supporting platform is mounted for vertical shifting relative thereto, the elongated work person supporting platform being lowerable over an elongated bulk material supporting vehicle disposed therebeneath.

2. Description of Related Art

Various different forms of access structures for bulk material containing vehicles heretofore have been provided. However, these previously known access systems do not include the overall combination of structural and operational features of the instant invention which enable access to the upper portions of various bulk material receiving vehicles in a manner such that work persons supported from the access structure are provided improved protection against accidents and positionable relative to the associated bulk material receiving vehicle in such a manner that substantially all usual work tasks may be performed thereon in a safe manner.

SUMMARY OF THE INVENTION

The vehicle access system or structure of the instant invention incorporates an upright framework along one side of which a horizontally elongated platform is mounted for vertical shifting relative to the framework.

An elongated bulk material vehicle may be maneuvered along side the framework beneath the platform and the latter may support work persons therefrom and be lowered into position closely overlying the upper portion of the bulk material receiving vehicle, whereby the upper portion of the vehicle may have work performed thereon by the work persons.

The platform is designed to extend along one side of the top portion of the associated vehicle and includes a fence extending thereabout with the side of the fence remote from the framework spaced considerably outwardly of the corresponding side of the platform. In this manner, the platform may be disposed along one side of the top portion of the associated bulk material receiving vehicle and the opposite portion of the fence may extend along the other side of the top portion of the associated vehicle to enable work persons to step from the platform onto the top of the vehicle and yet be continuously surrounded by a safety fence.

In addition, the framework includes a second stationary work person supporting platform relative to which the first mentioned platform is vertically adjustable and an elongated gangway is provided and has one end thereof pivotally mounted to one of the platforms and the other end thereof supported from the other platform for shifting transversely thereof during vertical movement of the first mentioned platform relative to the stationary platform.

The main object of this invention is to provide a vertically adjustable work person supporting platform for use in servicing the upper portion of an elongated bulk material receiving vehicle with the platform being vertically adjustable for positioning closely adjacent one side of the upper portion of the associated vehicle.

Another object of this invention is to provide, in accordance with the preceding object, a safety fence extending about the aforementioned platform and including end sections projecting outwardly from the side of the platform corresponding to the opposite side of the vehicle and being joined by a lengthwise extending fencing section for disposition over and alongside the said vehicle remote side to thereby enable work persons to step from the platform onto one side of the upper portion of the vehicle and yet be surrounded by fencing extending along the remote side of the associated vehicle.

Still another important object of this invention is to provide a vertically adjustable work person supporting platform in accordance with the preceding objects and including counterbalance structure for counterbalancing the weight of the platform.

A further object of this invention is to provide a support framework for the platform from which the latter is supported for guided vertical movement in cantilever supported fashion.

Another important object of this invention is to provide a vehicle access structure in accordance with the preceding objects and wherein the counterbalance structure is substantially fully enclosed.

A final object of this invention to be specifically enumerated herein is to provide a bulk material load vehicle access structure in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a first form of a vehicle access structure constructed in accordance with the present invention and in operative association with a bulk material handling semi-trailer;

FIG. 4 is an end elevational view of the vehicle access structure as seen from the left side of FIG. 2;

FIG. 5 is a fragmentary enlarged top plan view illustrating a telescopic hand rail utilized in conjunction with a gangway structure having self leveling stair treads and utilized as a means for walking between the stationary and vertically adjustable platforms of the access system;

FIG. 6 is a fragmentary horizontal sectional view illustrating one of the guide structures by which the vertically shiftable platform is guidingly supported from the support framework for the stationary platform;

FIG. 7 is an enlarged fragmentary side elevational view of one of the guide structures;

FIG. 8 is an end elevational view of a modified form of vehicle access structure wherein the stationary platform is eliminated and the support framework side of the vertical shiftable platform is provided with a hinged stairway of the type provided with self leveling treads and including a lower end equipped with ground enable wheels.

DESCRIPTION OF THE PREFERRED EMBODIMENTS

Figure 2:
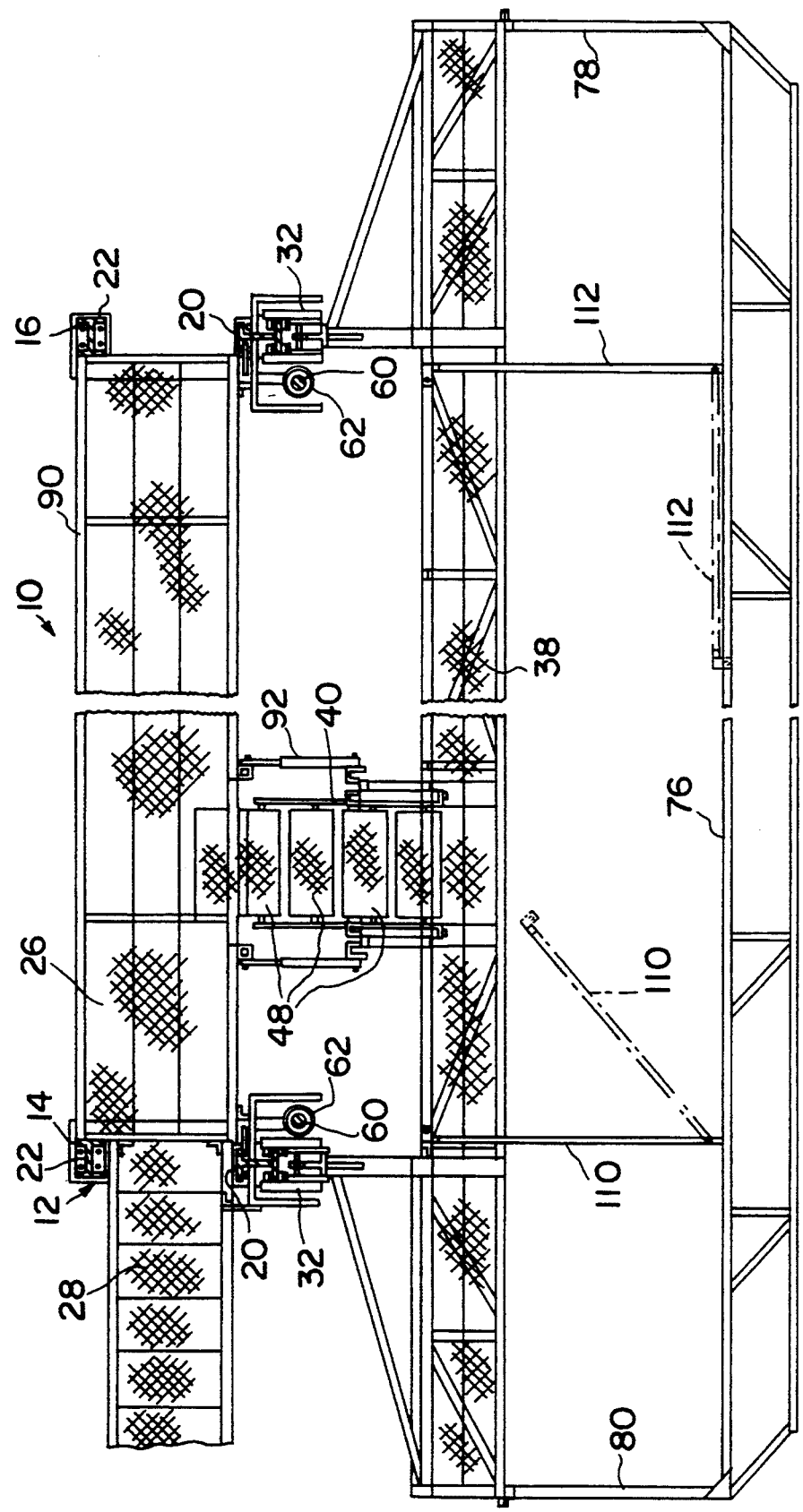
FIG. 2 is an enlarged top plan view of the access structure illustrated in FIG. 1.

Referring now more specifically to the drawings the numeral 10 generally designates the bulk material load vehicle access structure of the instant invention. The structure 10 includes a stationary upright framework referred to in general by the reference numeral 12 consisting of a pair of horizontally spaced apart, stationary uprights 14 and 16 disposed in a first upright plane. Brace structure 18 spans between and rigidly interconnects the upper end portions of the uprights 14 and 16, although the uprights 14 and 16 may be free standing.

The uprights 14 and 16 each include a pair of horizontally spaced apart posts 20 and 22 and the posts 20 and 22 of each upright 14 and 16 are disposed in a upright plane generally normal to the plane containing the uprights 14 and 16.

A stationary platform 26 extends between and is supported from the uprights 14 and 16 and a stationary stairway 28 is provided for gaining access to the elevated stationary platform 26 from the ground 30. The uprights 14 and 16 may be supported and anchored relative to the ground 30 in any convenient manner and the posts 20 may be considered as front posts. The posts 20 each have a pair of vertically spaced upper and lower followers or guides 32 and 34 guidingly supported therefrom and each pair of guides 32 and 34 are rigidly interconnected as at 36. Also, each pair of guides 32 and 34 support, in cantilever fashion, a corresponding end of an elongated, vertically shiftable platform 38 therefrom. The platform 38 is of a greater length than the stationary platform 26 and projects endwise outwardly of the opposite ends of the platform 26. In addition, the platform 38 is disposed forward of the posts 20 and the platform 26 is disposed rearward of the posts 20.

An elongated gangway 40 is provided and has one end thereof pivotally mounted relative to the platform 26 (framework 12) as at 42 and includes an inboard end step 44 for ease in access from the platform 26 to the gangway 40. The end of the gangway 40 remote from the step 44 is equipped with support wheels 46 rollingly engaged with the platform 38 and the gangway 40 is equipped with self leveling treads 48.

Figure 3:
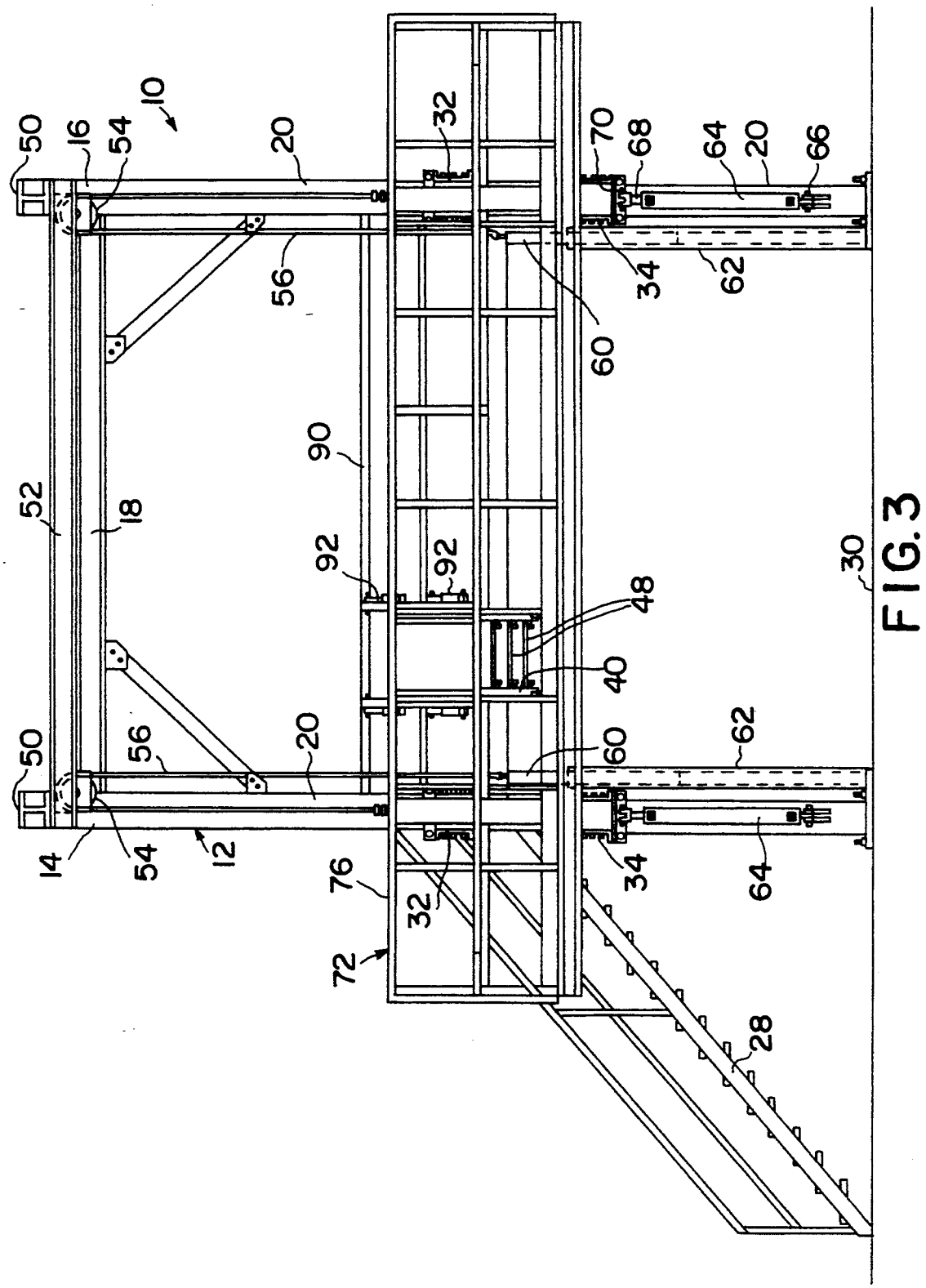
FIG. 3 is a front elevational view of the vehicle access structure.

Each upright 14 and 16 supports a forwardly projecting arm 50 from its upper end and the outer forward ends of the arms 50 are interconnected by a beam 52. Further, the upper end of each upright 14 and 16 journals a pulley 54 therefrom and a flexible cable 56 or the like is trained over each pulley 54 and has one end thereof anchored relative to the corresponding upper follower or guide 32 as at 58. The other end of each cable 56 supports a counterbalance weight 60 therefrom, see FIG. 3 and the counter-weights 60 are vertically elongated and downwardly telescopingly received within upright ground supported tubular guides 62. Further, the lower ends of a pair of hydraulic cylinders 64 are anchored relative to the lower ends of the posts 20 as at 66 and the upper ends of the extendable piston portions 68 of the hydraulic cylinder 64 are anchored relative to the lower guides or followers 34 as at 70. Thus, the total weight of the platform 38 is counterbalanced by the cables attached to the upper guides or followers 32 and the hydraulic cylinders 64 provided for raising and lowering the counterbalanced platform 38 are anchored relative to the lower guides or followers 34.

A fence construction referred to in general by the reference numeral 72 is provided and incorporates a pair of parallel opposite side sections 74 and 76 as well as a pair of opposite end sections 78 and 80 extending between and interconnecting corresponding ends of the side sections 74 and 76.

The side section 74 is supported from and extends along the corresponding longitudinal margin of the platform 38 and includes an entrance way 80 through which the gangway 40 projects. The end sections 78 and 80 extend forwardly from opposite ends of the side section 74 considerably past the front side of the platform 38 and are interconnected by the side section 76.

From FIG. 4 of the drawings it may be seen that when a bulk material handling vehicle 82 is disposed along side the front side of the framework 12, the platform 38 is spaced above one side portion 84 of the top portion of the vehicle 82 while the side section 76 of the fence construction 72 is disposed above the other side portion 86 of the top portion of the vehicle 82. Thus, when a work person standing on the platform 38 steps from the front side thereof onto the vehicle 82, he is disposed on the side of that vehicle 82 adjacent the platform 38. However, the fence construction 72 projects considerably forward of the forward marginal edge of the platform 38 and thereby enables a work person which has stepped from the platform 38 onto the top of the vehicle 82 to move across the center of the top portion vehicle 82 to the other side portion 86 thereof and still be contained within the safety fence construction.

The platform 26 includes railing 90 disposed thereabout which is interrupted at the top of the stairway 28 and at the rear end of the gangway 40. The gangway 40 further includes adjustable length railings 92 FIG. 5 to insure safety of work persons thereon at various adjusted angles of the gangway 40.

It may be seen from FIG. 6 of the drawings that each of the posts 20 comprises an I-beam with the guide or follower 32 including a pair of horizontally aligned rollers rollingly engaged with the front side of the corresponding post 20 and two vertically spaced pairs of rollers 96 rollingly engaged with the rear side of each post 20 while the guides or followers 34 each include two vertically spaced pairs of rollers 94 rollingly engaged with the front side of the corresponding post 20 Also, the lower guides or followers 34 each include journaled opposite side rollers 100 rollingly engaged with opposite sides of the corresponding posts 20 and the upper guides or followers 32 each include corresponding journaled opposite side rollers 102 rollingly engaged with opposite sides of the corresponding post 20.

With reference now more specifically to FIG. 8 of the drawings, the reference numeral 10' generally designates a modified form of access system. The access system 10' is substantially to the access system 10, except that a stationary platform corresponding to platform 26 is not provided and a stairway 28' corresponding to the stairway 28 is provided but pivoted to the platform 38' corresponding to the platform 38 as at 39. The stairway 28' includes self leveling treads 41 and ground engaging rollers 43 on its lower end. Furthermore, the access system 10' does not include the extended ends of the arm 50 nor an interconnecting beam 52. Otherwise, the access system 10' is structurally and operationally similar to the access system 10.

The fence construction 72 includes horizontally swingable transverse gates 110 and 112 closable between the side sections 74 and 76 of the fence construction and with their rear ends swingable toward each other and the side section 76 to partial and/or full open positions thereof such as that indicated by phantom lines in FIG. 2. Thus, the workman supporting structure including the platform 38 and the fence construction 72 may be effectively shortened for use in conjunction with shorter vehicles 82.

In operation, the hydraulic cylinders 64 (other force means may be used) may be actuated in any convenient manner (not shown) in order to raise the platform 38 above the position thereof illustrated in FIG. 1 to the position thereof illustrated in solid lines in FIG. 4. Then, the vehicle 82 may be positioned beneath the platform 38 and fence construction 72 and the platform 38 then may be lowered to or slightly below the phantom line position thereof illustrated in FIG. 4. At this point, the platform 38 is positioned closely adjacent the side portion 84 of the upper portion of the vehicle 82 and work persons disposed on the platform 38 may step off of the platform 38 onto the top of the vehicle 82 and perform work tasks on the upper portion of the vehicle 82 totally within the confines of the fence construction 72 with great safety.

After the desired work has been performed, the platform 38 again may be raised to the solid line position thereof illustrated in FIG. 4 and the vehicle 82 may be moved away from the access system 10.

Any suitable means such as screw jacks or winch systems may be used in lieu of the hydraulic cylinders 64. Also, the guides or followers 32 may include emergency brake mechanisms (not shown) operative to maintain the platform 38 in elevated position should the hydraulic cylinder 64 fail with a load being supported from the platform 38. However, the counterbalance weights 60, will, preferably, more than counterbalance the weight of the platform 38 such that failure of the cylinders 64 will result in the platform 38 moving upwardly as opposed to downwardly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bulk material load vehicle access structure, comprising:
    a stationary upright framework;
    a stationary platform supported by said framework;
    a substantially horizontal service platform movable along a vertical axis and with respect to said stationary platform;
    means for moving said service platform along a vertical axis and with respect to said framework;
    said service platform accessible from said stationary platform regardless of the vertical position of said service platform, said service platform further comprising a fence and configured to allow a person to step off of said service platform and onto a top of a bulk material load vehicle placed under said service platform while still being protected by said fence.

2. The bulk material load vehicle access structure according to claim 1, wherein said configuration allowing a person to step off of said service platform and onto a top of a bulk material load vehicle placed under said service platform while still being protected by said fence comprises:
    said service platform having a first longitudinal margin adjacent said framework, a second longitudinal margin spaced from said framework, and end margins;
    and said fence comprising:
    a first portion extending along said first longitudinal margin and defining an entrance;
    second and third portions extending from their first respective ends adjacent ends of said first portion, along said respective end margins and outwardly of said second longitudinal margin and greater than the width of said platform; and
    a fourth portion connecting said other ends of said second and third portion.

3. The structure according to claim 2, wherein one of said ends of said gangway extends through said entrance of said fence.

4. The structure according to claim 2, wherein said service platform further comprises:
    at least one horizontally swingable gate extending between said first and fourth fence portions and spaced inwardly from said end fences.

5. The structure according to claim 1, wherein said service platform is accessible from said stationary platform by a gangway having first and second ends, said first end pivotably supported by one of said platforms and said second end being supported by said other platform for relative movement therewith.

6. The structure according to claim 5, wherein second end of said gangway being supported by said other platform for relative movement therewith by rollers.

7. The structure according to claim 6, wherein said other platform is said service platform.

8. The structure according to claim 5, wherein said gangway is inclined and includes self-leveling treads.

9. The structure according to claim 1, further comprising a counterbalance for counterbalancing the weight of said service platform.

10. The structure according to claim 1, wherein said means for moving comprises a fluid cylinder connected on one end of said framework and on said other end to said service platform.

11. The structure according to claim 1, wherein said structure has a fixed footprint.

12. The structure according to claim 1, wherein said structure takes up a fixed floor space of a mounting site.

* * * * *